March 6, 1956 F. CARETTA 2,737,072
CHUCK AND DRIVING LATHE CONTROL DEVICE
Filed April 15, 1952 3 Sheets-Sheet 2

INVENTOR.
Fausto Caretta
BY
Watson, Cole, Grindle & Watson
ATTys.

March 6, 1956 F. CARETTA 2,737,072
CHUCK AND DRIVING LATHE CONTROL DEVICE
Filed April 15, 1952 3 Sheets-Sheet 3

INVENTOR.
Fausto Caretta
BY
Watson, Cole, Grindle & Watson
ATTys.

United States Patent Office 2,737,072
Patented Mar. 6, 1956

2,737,072
CHUCK AND DRIVING LATHE CONTROL DEVICE

Fausto Caretta, Buenos Aires, Argentina

Application April 15, 1952, Serial No. 282,361

3 Claims. (Cl. 82—28)

This invention relates to improvements in lathes, and more particularly to a chuck and driving lathe control device which enables to stop the rotation or to brake the lathe spindle and at the same time enables the operation of the jaws of the chuck or other work-holder, by means of a single lever or treadle.

In known lathes, and more particularly in turret lathes, it is necessary to stop the driving motor each time it is desired to open the chuck jaws in order to advance, remove or otherwise move the work, whereupon the motor is again started so as to proceed with the work.

This method has many drawbacks, among which may be cited the considerable loss of time involved in the separate operations of stopping the motor, opening the chuck jaws, closing the jaws again and re-starting the motor; the necessity of acting on several lathe controls in order to perform these operations, and the resulting lower production.

The above drawbacks are overcome by means of the device of this invention, which provides a single control lever by means of which it is possible to uncouple the driving connection between the motor and the spindle and also to open the chuck jaws so as to release the work.

The device of this invention comprises a main bell-crank lever fixedly mounted on a shaft mounted in bearings provided in the lathe legs, one arm of said bell-crank lever being preferably shorter than the other and connected through a link to a bracket supporting the lathe motor, whereas the other preferably longer arm of said bell-crank lever is connected through a flexible line to the headstock, which is provided with a loaded spring unit so arranged that a pull exerted on said flexible line will open the chuck jaws, while the release of said line will return said chuck jaws to their closed position.

A treadle or foot lever is secured to or formed integral with said bell-crank lever shaft, which is so arranged on said shaft that a first depression of the treadle will raise the motor on said bracket, thereby loosening the tension on the belt and uncoupling the driving connection with the spindle and a further second depression of the treadle will exert a pull on the headstock control fork, so as to cause the opening of the chuck jaws.

Therefore, one of the objects of the invention is to provide a novel device having a single control means for stopping the rotation of a lathe spindle without stopping the lathe motor, and for subsequently opening and closing the jaws of the chuck or other work holder, and for re-starting the spindle.

A further object of the invention is to provide a device of the aforesaid type, wherein the braking of the lathe spindle is obtained by means of the same axial thrust actuating the work holder, subsequently to the uncoupling of the driving motor.

A further object of the invention is to provide a device as mentioned above, wherein the closing stress of the chuck jaws is made invariable by means of a loaded spring unit.

A still further object is to provide a device of the aforesaid type, wherein the closing stress may be obtained in either direction by means of the same loaded spring unit, by simply changing the direction of movement of the thrust collar.

A still further object of the invention is to provide a device of the type mentioned above, wherein the reversal of the direction of the actuation of the thrust collar is obtained by means of a simple change in the position of the fulcrum of the control fork.

A further object of the invention is to provide a device of the aforesaid type, wherein the single control means is constituted by a foot lever, whereby the operation of opening the chuck jaws, may be carried out in a quick and easy manner by an operator who will thus have his hands free for handling the work.

A further object of the invention is to provide a device for stopping the rotation of the lathe spindle and subsequently opening the work holder or chuck jaws, which is simple in construction and operation.

Other objects and advantages of this invention will become apparent in the course of the following description. In order that the invention may be more clearly understood and readily carried out, preferred embodiments thereof have been illustrated by way of example in the accompanying drawings, wherein:

Fig. 3 is a rear view of the headstock.

The same reference characters are used to indicate like or corresponding parts throughout the drawings.

Figure 1:
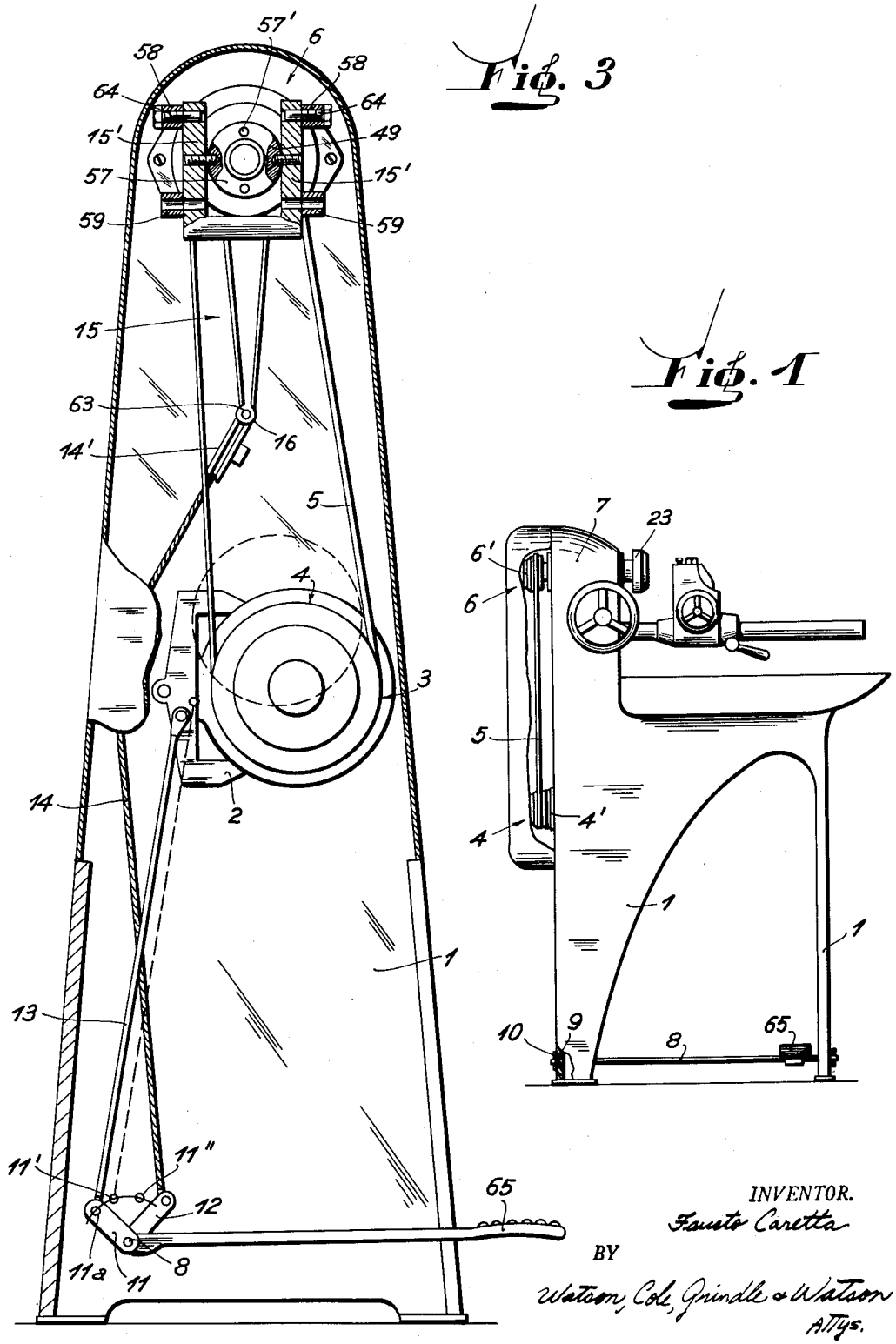
Fig. 1 is a side view of a lathe incorporating the device in accordance with this invention.

With reference to the drawings, Fig. 1 shows one of the two legs 1 supporting the lathe. Mounted on one of said legs 1 is a bracket 2 supporting an electric motor 3. The driving shaft of this motor 3 is provided with a pulley 4 having a plurality of offset grooves 4' each of which is adapted to receive an endless belt 5 which is passed also around a corresponding one of a plurality of similar grooves 6' provided in a pulley 6 of the headstock 7 of the lathe.

The aforesaid motor supporting bracket 2 is pivotally mounted on the lathe as is customary, so that the weight of the motor 3 will maintain the belt 5 under tension, for a proper driving of the lathe spindle.

A shaft 8 is provided between the pair of opposite legs 1, near the lower ends and towards the rear thereof, the ends of said shaft 8 being rotatingly mounted in aligned holes 9 formed in said legs and projecting slightly therefrom so as to be supported by keys 10.

Suitably splined on shaft 8 or formed integral therewith is a bell-crank lever comprising a short arm 11 and a longer arm 12. This bell-crank lever is shown in its normal inoperative position in full lines in Fig. 1, with the short arm 11 extending rearwardly and the longer arm 12 directed forwardly. One end of a connecting rod or link 13 is pivoted to the free end of arm 11, while the other end thereof is connected to the motor 3 or to the bracket 2 thereof, at a point near the pivot of the latter, by any suitable means, such as a bolt and eye connections as shown.

A flexible line 14 extends from the free end of bell-crank lever arm 12, to which it is anchored, to the lower end 16 of a fork member 15 provided at the rear end of the lathe headstock 7.

As shown, the headstock 7 comprises a spindle 17, having housed therein a push-pull tubular member 18 arranged for rotation therewith but capable also of being displaced longitudinally therein, as will be explained presently.

The spindle 17 is formed with a flange 19 emerging out of the headstock 7, said flange being suitably provided with an annular projecting ring 20.

A push-pull transmitting member 21 is screwed onto the screw-threaded end 22 of push-pull tubular member 18, and a chuck 23 having the usual jaws 24 is secured to said projecting ring of spindle flange 19 by means of screws 25 passing through suitable perforations 26 in chuck 23 wherein they are slidably housed, and engaging correspondingly screw-threaded holes in said ring 20.

Each jaw carries suitably pivoted as at 27 a lever 28, the free end of which engages a circular groove 29 formed in the free end of said push-pull transmitting member 21. These jaws 24 may be controlled and adjusted in any known manner such as by means of the device disclosed in my co-pending application Serial No. 282,362, now abandoned.

The jaws 24 are thus actuated by moving the push-pull tubular member 18 in either direction along its longitudinal axis 30, thereby swinging the pivoted levers 28 about their respective pivots 27.

As mentioned above, the push-pull tubular member 18 is arranged so as to rotate with spindle 17 but is also capable of being displaced longitudinally in either direction with respect to said spindle 17. For this purpose, the push-pull tubular member 18 is provided with a feather key 31, engaging a key way 32 formed in spindle 17 (see Fig. 2). This keyway 31 is substantially longer than the feather key 31 and located so as to extend for some distance ahead and behind of feather key 31, so that the push-pull tubular member 18 may be moved longitudinally in either direction relative to spindle 17, with the feather key 31 guided in keyway 32.

The headstock pulley 6 which, as mentioned above, includes a plurality of offset grooves 6' is fixed to the spindle 17. This pulley 6 has a recess 33 (Fig. 2) adapted to house a portion of a loaded spring unit 34 comprising a plurality of loaded springs 35 confined by a front wall 36, a rear wall 37 which is turned so as to extend over a portion of the outer loaded spring 35 as shown, and having an outwardly directed flange 38, the outer surface of which is engaged by a ring 39 housed in a groove 40 formed in recess 33, near the end thereof. The loaded spring unit 34 also comprises an inner annular base 41 having at the end an outwardly turned flange 42 the inner surface of which engages the front wall 36. Preferably the inner annular base 41 does not extend rearwardly to the rear wall 37, but ends at a short distance therefrom, as clearly shown in Fig. 2, and a ring member 43 having substantially the same thickness as the base 41 is provided with a plurality of holes adapted to receive screws such as 44 entering in corresponding screw-threaded hole in base member 41. The ring 43 has a radial flange 45, the inner surface of which engages the outer surface of wall 37 as shown.

Figure 2:
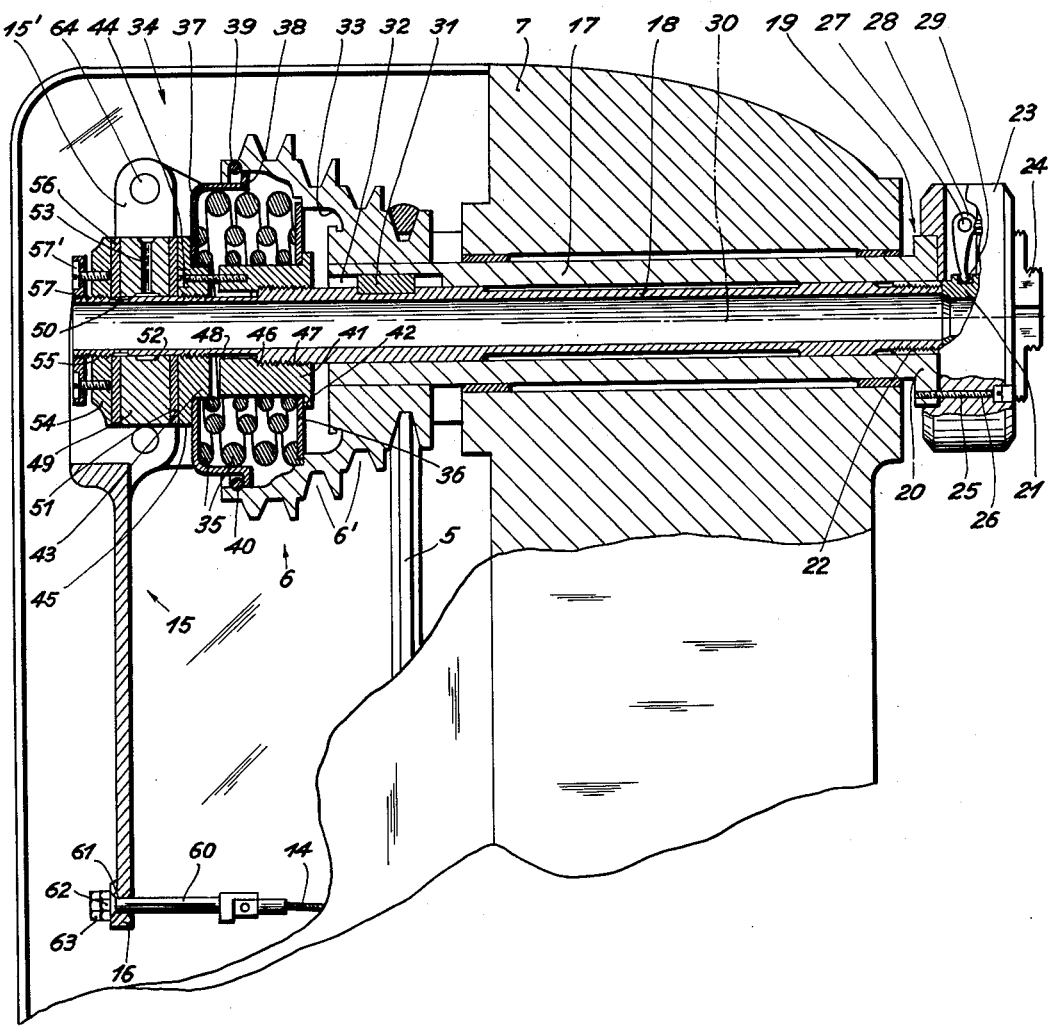
Fig. 2 is a longitudinal sectional view of a lathe headstock, showing the novel means for opening the jaws of the chuck or other work holder.

It will be seen that in this manner the loaded spring unit 34 will form a self-contained assembly, and in order to mount said unit 34 on the push-pull tubular member 18, the outer diameter of the latter projecting rearwardly from spindle 17 slightly reduced towards the rear end, as shown in Fig. 2, thereby forming a shoulder 46, and the outer surface of the push-pull member 18 is screw-threaded for some distance forwards from shoulder 46, as shown at 47. The thickness of spring unit base 41 is also slightly reduced towards the front thereof, and the reduced portion of base 41 and the ring 43 are provided with internal screw-threads 47 and 48 respectively adapted to engage the threaded portions of the push-pull tubular member 18.

In order to cause the aforesaid longitudinal displacement of push-pull tubular member 18 within the spindle 17, by means of the single control of this invention, the fork member 15 mentioned above carries an annular member 49 which may be integral therewith but in the drawings is shown as a separate member secured to said fork member by means of a pair of screws or the like. Said annular member 49 has a central opening 50 so that said member may be slidably fitted over the push-pull tubular member 18. Since the spring unit 34 will rotate with said push-pull tube 18, whereas the fork annular member 49 will not, a washer 51 is freely inserted between the latter and the spring unit 34, so as to reduce friction. In order to further reduce friction, the inner face of annular member 49 is formed with an annular shallow recess 52, so as to form a lubricating chamber which may be filled with a lubricant through a radial orifice 53 in said annular member 49, communicating therewith.

The rear end of the push-pull member 18 is screw-threaded as shown, for a distance short of the fork annular member 49, and a further ring member 54 is internally threaded as at 55 so that it may be screwed onto the push-pull tubular member 18 as shown, with the interposition of a washer 56 between said ring 54 and the fork annular member 49 so as to reduce friction. Finally, an end ring member 57 is screwed onto the rear end of the push-pull tubular member 18 (Fig. 2) and fixed to the aforesaid ring member 54 by means of screws 57'.

Each arm 15' of fork 15 is provided with two pairs of orifices, one near the upper end and the other towards the lower end thereof, each pair of upper orifices and lower orifices being aligned, while the lathe body is provided with a pair of upper eye members 58 located above the longitudinal axis 30 of push-pull tubular member 18, and a pair of lower eye members 59 positioned below said longitudinal axis 30, whereby said fork member 15 may be pivoted either above or below the longitudinal axis 30 of the push-pull member 18, depending on the type of lathe in connection with which the device of this invention is used, as will be explained hereinafter.

The flexible line 14 anchored to the bell-crank lever arm 12 is passed over one or more suitable sheaves 14' (not all shown) and terminates in a pin 60 fixed thereto, the free end of pin 60 being screw-threaded and passing through an eye 61 in the lower end 16 of fork 15, wherein it is secured by any suitable means such as a nut 62 and a counter-nut 63.

If the lathe is of the type wherein the chuck jaws are opened by a forward movement of the push-pull tubular member 18 (from left to right in Fig. 2), the fork arms 15' will be pivoted by passing a pair of bolts 64 through the upper pair of eye member 58 and penetrating the ends thereof into the upper orifices in said arms 15', so that the fulcrum of fork member 15 will be located above the longitudinal axis 30 of push-pull tubular member 18, whereas if the lathe is of the type in which the chuck jaws are opened by moving the push-pull tubular member 18 backwards, the fork 15 will be pivoted by passing the bolts 64 through the lower pair of eye members 59 and penetrating same into the lower orifices in fork arms 15', so that the fork fulcrum will be located below the longitudinal axis 30 of push-pull tubular member 18.

In order to operate the bell-crank lever 11—12, the shaft 8 is provided with a foot lever 65 formed integrally therewith or suitably fixed thereto.

In operation, the driving belt 5 will be under tension due to the weight of the motor 3 on bracket 2. When it is desired to change or otherwise move the work, the foot lever 65 is first depressed for a short distance, thereby moving the bell-crank lever arm 11 forwardly and consequently the free end thereof upwardly for a short distance beyond dead-center. This will cause the connecting rod 13 to move upwardly, thereby raising the motor 3 and consequently loosening the driving belt 5 and uncoupling the driving connection between motor 3 and spindle 17, without stopping the motor. Under these conditions, the spindle 17 may be quickly brought to a stop by hand.

The foot lever 65 is then depressed further thereby moving bell-crank lever arm 12 downwardly, whereby the flexible line 14 will exert a pull on the lower end 16 of fork member 15. With the fork 15 pivoted above the longitudinal axis 30 of push-pull tubular member 18, this pull exerted on the lower end of fork member 15 will cause the lower ends of fork arms 15' to act against the lower portion of loaded spring unit 34, thereby moving the push-pull tubular member 18 forwardly. This movement of member 18 will displace the jaw levers 28, thereby opening the chuck jaws 24.

Once the work has been changed or otherwise moved, the release of the foot lever 65 will gradually return the bell-crank lever 11—12 to its initial position, whereby the pull on fork member 15 will first be released, thereby moving the push-pull tubular member 18 and members associated therewith back to their normal position due to the action of the spring unit 34, and again closing the chuck jaws 24. The connecting rod 13 will then be lowered, thereby lowering the motor 3 on bracket 2. This will place the driving belt 5 again under tension and reestablish the driving connection between the motor 3 and the spindle 17, whereupon the lathe will again operate normally.

It is of course possible to link said flexible line 14 to the bracket 2 and thus arm 12 will not be required, but the drawback of this arrangement resides in the fact that the weight of the bracket 2 and motor 3 is to be lifted to a further extent in order to exert the required force for displacement on said flexible line 14. In the embodiment as first described the force required for actuating the flexible line is smaller since arm 11 moves in the proximity of the upper dead center as indicated at 11', 11" and 11a. The arc 11a—11' is the one corresponding to the lift of the bracket 2, whilst the arc 11'—11" is the "dead center portion."

It will be understood from the above that when the lathe is of the type wherein the chuck jaws 24 are opened by moving the push-pull tubular member 18 backwards and the fork member 15 is therefor pivoted at a point below the longitudinal axis 30 of push-pull tubular member 18, as explained above, the pull exerted on the fork end 16 will cause the upper ends of fork arms 15' to act against the upper portion of the loaded spring unit 34, thereby moving the push-pull tubular member 18 backwards so as to displace the jaw levers 28 and open the chuck jaws 24. The release of the pull on fork end 16 due to the release of the foot lever 65 will also close again the chuck jaws and cause the parts associated with the push-pull tubular member 18 to return to their normal position.

It will be seen from the above that the novel loaded spring unit 34 has the dual function of taking the place of the spring member usually provided for urging the tubular member 18 backwards, and also of returning the parts to their initial position after the chuck jaws are opened by means of the device of this invention.

This loaded spring unit has the advantage over known constructions that it is capable of being removed from the push-pull tubular member 18 and replaced thereon without having to reload the springs, since the unit will not lose its initial load.

While the connecting rod 13 has been described and shown as connected between the bell-crank lever arm 11 and the motor 3, it should be understood that said connecting rod 13 may be equally well, and preferably will be, connected to the motor bracket 2 instead of being connected to the motor.

Figure 4:
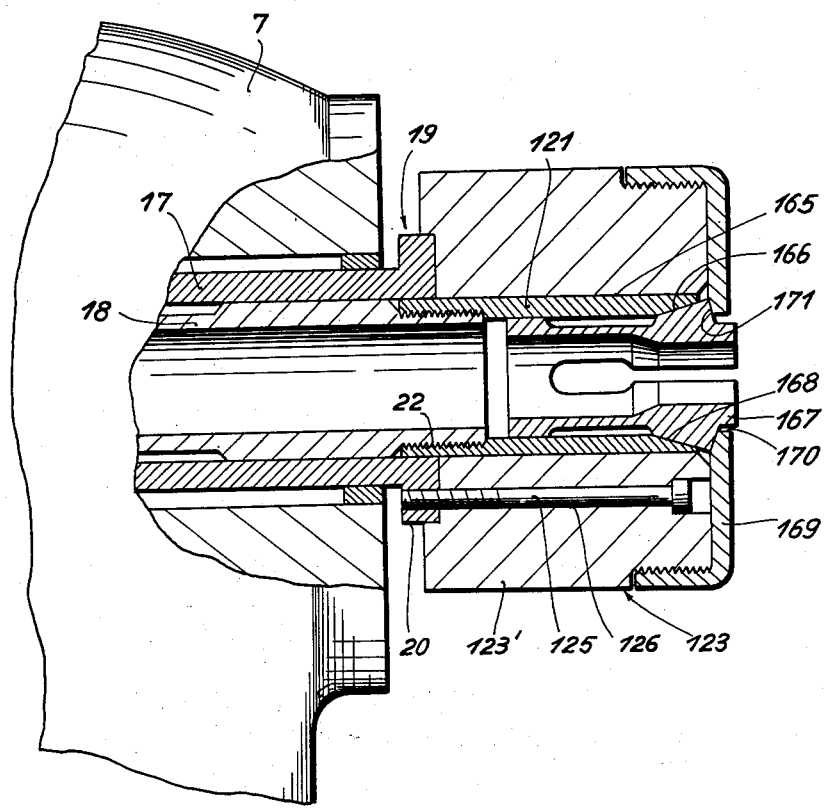
Fig. 4 is a longitudinal sectional view of a clamp.

From the above it is obvious that any other suitable work-holder instead of chuck 23 may be used and to this end in Figure 4, by way of example a clamp 123 has been shown including a casing 123' having a plurality of suitable perforations 126 in which screws 125 are housed which fix said casing 123 to said spindle flange 19 and more particularly engage corresponding screw-threaded holes in said ring 20 of said spindle 17 emerging out of headstock 7.

On the screw threaded end 22 of push-pull tubular member 18 a hollow push-pull transmitting member 121 is screwed onto. Said push-pull transmitting member 121 is slidably housed in central boring 165 of casing 123' and having at its free end a conical actuating surface 166. A resilient jaw assembly 167 is housed in said push-pull transmitting member 121 and having complementary conical actuating surfaces 168 controlled by said conical actuating surface 166 of said push-pull transmitting member 121.

A cover cup 169 is screwed onto casing 123, and having a central opening 170 limiting the forward movement of the resilient jaw assembly 167 provided to this end with a shoulder 171.

It will be readily understood that upon backward movement of push-pull tubular member 18 the jaws of the resilient jaw assembly 167 will open and upon forward movement, it will close.

It is obvious also that many changes, modifications and/or alterations will occur to those skilled in the art, without departing from the scope of the invention as clearly set forth in the appended claims.

I claim:

1. A control linkage for lathes having a spindle, a power source pivoted for movement toward and away from said spindle and belted thereto, and a chuck on said spindle and having jaws movable to grip and release a work piece, said linkage comprising a manually operable horizontally pivoted lever, a bell crank lever mounted below said power source to rock with said first lever and having angularly spaced arms, a link connecting one of said arms and said power source for moving the latter about its pivot, and means operatively connecting said other arm and said movable jaws, said link connection to said power source lying close to the pivot axis of the latter whereby a small movement of said link results in a magnified movement of said power source, said first-mentioned arm being so mounted relative to said manually operable lever as to move toward and away from a vertical position upon movements of said lever, said other arm moving toward and away from a horizontal position upon said movements.

2. A control linkage as defined in claim 1, said first-mentioned arm being shorter than said other arm.

3. A control linkage as defined in claim 1, said first-mentioned arm being so mounted relative to said manually operated lever that the former moves toward linearity with said link as the latter is depressed.

References Cited in the file of this patent

UNITED STATES PATENTS

| | | |
|---|---|---|
| 112,971 | Sheldon | Mar. 21, 1871 |
| 144,178 | Woerd | Oct. 28, 1873 |
| 370,604 | Cahill | Sept. 27, 1887 |
| 759,074 | Cahill | May 3, 1904 |
| 927,424 | McClellan | July 6, 1909 |
| 1,115,558 | McCormack | Nov. 3, 1914 |
| 1,698,729 | O'Connor | Jan. 15, 1929 |
| 1,799,261 | Stoody | Apr. 7, 1931 |
| 2,448,030 | Hinckley | Aug. 31, 1948 |
| 2,467,569 | Walters | Apr. 19, 1949 |
| 2,512,051 | Beach | June 20, 1950 |
| 2,535,246 | Welch | Dec. 26, 1950 |

FOREIGN PATENTS

| | | |
|---|---|---|
| 465,138 | Germany | Aug. 23, 1928 |